United States Patent
Park

(10) Patent No.: US 9,882,381 B2
(45) Date of Patent: Jan. 30, 2018

(54) PHOTOVOLTAIC INVERTER

(71) Applicant: LSIS CO., LTD., Anyang-si, Gyeonggi-do (KR)

(72) Inventor: Tae Bum Park, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 833 days.

(21) Appl. No.: 14/465,589

(22) Filed: Aug. 21, 2014

(65) Prior Publication Data

US 2015/0061397 A1   Mar. 5, 2015

(30) Foreign Application Priority Data

Sep. 2, 2013   (KR) .......................... 10-2013-0105043

(51) Int. Cl.
*H02J 1/10*   (2006.01)
*H02M 1/00*   (2006.01)

(52) U.S. Cl.
CPC ............... *H02J 1/102* (2013.01); *H02M 1/00* (2013.01); *Y02E 10/56* (2013.01); *Y10T 307/707* (2015.04)

(58) Field of Classification Search
CPC ....... H02M 1/00; H02J 1/102; Y10T 307/707; Y02E 10/56
See application file for complete search history.

(56) References Cited

U.S. PATENT DOCUMENTS 9,218,013 B2 * 12/2015 Kikinis ............. H01L 31/02021
2006/0176029 A1 * 8/2006 McGinty ................ H02M 3/155
323/222

(Continued)

FOREIGN PATENT DOCUMENTS

CN     102611356      7/2012
JP     2000-340824   12/2000
(Continued)

OTHER PUBLICATIONS

State Intellectual Property Office of the People's Republic of China Application Serial No. 201410444252.3, Office Action dated Feb. 22, 2016, 7 pages.

(Continued)

*Primary Examiner* — Daniel Kessie
(74) *Attorney, Agent, or Firm* — K&L Gates, LLP

(57) ABSTRACT

This invention relates to a photovoltaic inverter, capable of connecting a plurality of photovoltaic modules to each input port of a multi-string photovoltaic inverter through a single booster. The photovoltaic inverter disclosed herein includes a plurality of input portions connected in series to a plurality of photovoltaic modules, respectively, a plurality of reactors connected in series to the plurality of input portions, respectively, a first capacitor configured to charge DC voltages of the plurality of photovoltaic modules, respectively, transferred through the plurality of input portions, a first resistor connected in parallel to the first capacitor, a booster unit connected in parallel to the first capacitor and the first resistor connected in parallel to each other, and configured to boost the voltages charged in the first capacitor, and an inverter unit configured to convert the voltage boosted by the booster unit into an AC voltage to provide to a grid.

4 Claims, 2 Drawing Sheets

(56) References Cited

U.S. PATENT DOCUMENTS

| | | | | |
|---|---|---|---|---|
| 2008/0036440 | A1* | 2/2008 | Garmer | G05F 1/67 323/299 |
| 2010/0302819 | A1* | 12/2010 | O'Brien | G05F 1/67 363/95 |
| 2011/0188276 | A1* | 8/2011 | Schill | H02J 3/383 363/131 |
| 2012/0182001 | A1* | 7/2012 | Huang | H02M 3/158 323/283 |
| 2013/0076150 | A1 | 3/2013 | Wagoner et al. | |

FOREIGN PATENT DOCUMENTS

| | | |
|---|---|---|
| JP | 2003070241 | 3/2003 |
| JP | 2003124492 | 4/2003 |
| JP | 2007133765 | 5/2007 |
| JP | 2007272639 | 10/2007 |
| JP | 2008-252987 | 10/2008 |
| KR | 10-2011-0070481 | 7/2011 |
| WO | 2013094838 | 6/2013 |

OTHER PUBLICATIONS

Japan Patent Office Application Serial No. 2014-176744, Office Action dated Jun. 21, 2016, 2 pages.

European Patent Office Application Serial No. 14182252.8, Search Report dated May 7, 2015, 6 pages.

Japan Patent Office Application Serial No. 2014-176744, Office Action dated Dec. 1, 2015, 2 pages.

Korean Intellectual Property Office Application No. 10-2013-0105043, Notice of Allowance dated May 19, 2017, 5 pages.

\* cited by examiner

PHOTOVOLTAIC INVERTER

CROSS-REFERENCE TO RELATED APPLICATION

Pursuant to 35 U.S.C. § 119(a), this application claims the benefit of earlier filing date and right of priority to Korean Application No. 10-2013-0105043, filed on Sep. 2, 2013, the contents of which are all hereby incorporated by reference herein in its entirety.

BACKGROUND OF THE DISCLOSURE

1. Field of the Disclosure

This specification relates to a photovoltaic inverter, and particularly, to a photovoltaic inverter, capable of connecting a plurality of photovoltaic modules to an input port of a multi-string photovoltaic inverter through a single booster.

2. Background of the Disclosure

In general, a photovoltaic inverter (or a grid-connected inverter) is an electric power conversion system, namely, a system by which an input photovoltaic electric power grid and a commercial electric power grid are connected to each other so as to transmit the electric power of the input photovoltaic power grid to the commercial power grid.

A topology of the photovoltaic inverter may include a multi-string method.

The multi-string method refers to a method of receiving photovoltaic power inputs from two (or plural) photovoltaic modules. The multi-string method may be distinguished from the conventional method of receiving an input from a single photovoltaic module. In the photovoltaic inverter having type of multi-string, it is more efficient to connect two or more photovoltaic modules with the photovoltaic inverter than to connect a single photovoltaic module with the photovoltaic inverter.

However, the multi-string type photovoltaic inverter according to the conventional art should have a booster for each input port depending on the number of photovoltaic modules when connecting the plurality of photovoltaic modules to the single photovoltaic inverter, which may bring about an increase in fabricating costs of a product.

SUMMARY OF THE DISCLOSURE

Therefore, an aspect of the disclosure is to provide a photovoltaic inverter, capable of connecting a plurality of photovoltaic modules through a single booster to a multi-string type photovoltaic inverter, without employing a booster for each input port of the photovoltaic inverter.

To achieve these and other advantages and in accordance with the purpose of this disclosure, as embodied and broadly described herein, there is provided a photovoltaic inverter comprising:
- a plurality of input portions connected in series to a plurality of photovoltaic modules, respectively;
- a plurality of reactors connected in series to the plurality of input portions, respectively;
- a first capacitor configured to store DC voltages of the plurality of photovoltaic modules, respectively, transferred through the plurality of input portions;
- a first resistor connected in parallel to the first capacitor;
- a booster unit connected in parallel to the first capacitor and the first resistor connected in parallel to each other, and configured to boost the voltages charged in the first capacitor; and
- an inverter unit configured to convert the voltage boosted by the booster unit into an AC voltage to provide to a grid.

According to one aspect of this disclosure, the first capacitor is configured to charge (in other words "store") an average value of the DC voltages of the plurality of photovoltaic modules.

According to another aspect of this disclosure, the first resistor is configured to consume the voltage charged in the first capacitor.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this disclosure illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
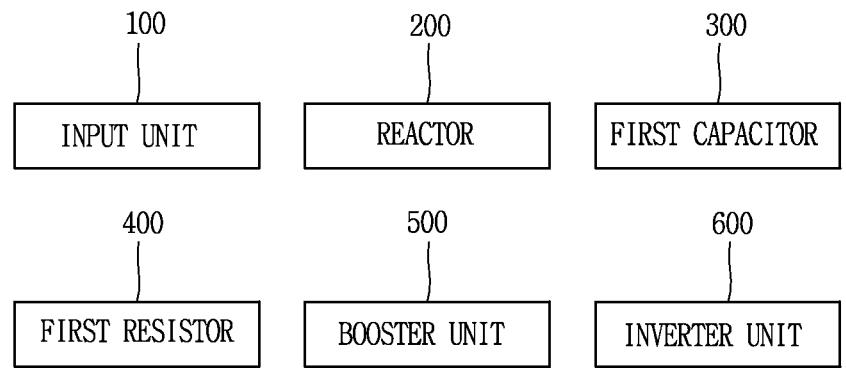
FIG. 1 is a block diagram illustrating a configuration of a photovoltaic inverter in accordance with a preferred embodiment of this invention.

FIG. 1 is a block diagram illustrating a configuration of a photovoltaic inverter 10 in accordance with a preferred embodiment of this invention.

As illustrated in FIG. 1, a photovoltaic inverter 10 may include an input unit 100, a reactor 200, a first capacitor 300, a first resistor 400, a booster unit 500 and an inverter unit 600. However, it will be understood that implementing all of the illustrated components of the photovoltaic inverter 10 illustrated in FIG. 1 is not a requirement. Greater or fewer components may alternatively be implemented.

Figure 2:
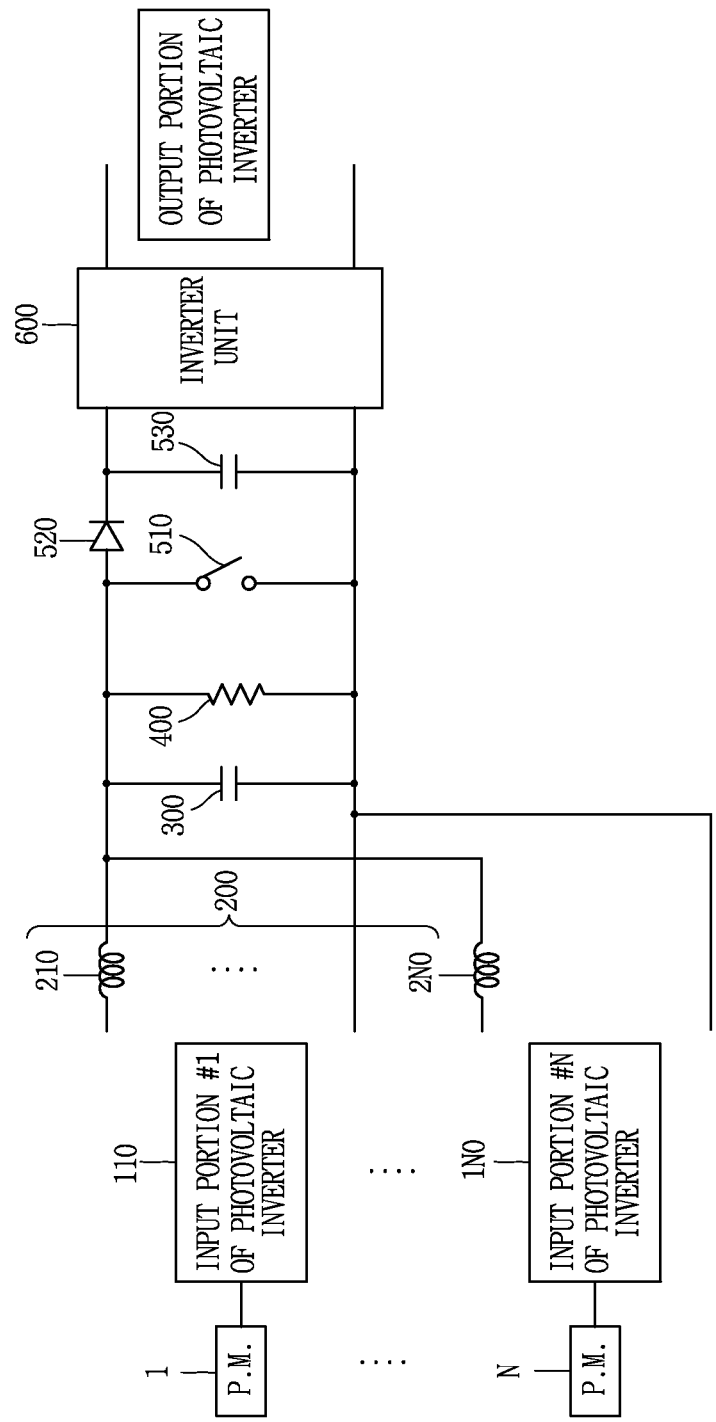
FIG. 2 is a circuitry view of the photovoltaic inverter in accordance with the embodiment of this invention.

The input unit 100, as illustrated in FIG. 2, may include a plurality of input portions, for example, a first input portion 110, a second input portion 120, . . . , and an $N^{th}$ input portion 1N0.

Also, the plurality of input portions included in the input unit 100 may be connected to a plurality of photovoltaic modules in series, respectively.

For example, the first input portion 110 may receive a first DC voltage (or power/current/energy) transferred from a first photovoltaic module 1 connected thereto in series, and the second input portion (not shown) may receive a second DC voltage transferred from a second photovoltaic module (not shown) connected thereto in series. Here, the first DC voltage and the second DC voltage may have the same value or different values.

The reactor 200 may be provided as many as the number of the input portions included in the input unit 100.

That is, the reactor 200 may include a plurality of reactors, for example, a first reactor 210, a second reactor (not shown), . . . , and an $N^{th}$ reactor 2N0.

Also, the reactor 200 may be connected to the input unit 100 in parallel.

The first capacitor 300 may be connected to the reactor 200 (or the input unit 100) in series.

The first capacitor 300 may store (in other words "charge") DC voltages (in other words DC electric power or DC current or DC electric energy) of the plurality of photovoltaic modules (1-N), which are transferred through the input unit 100. Here, the first capacitor 300 may charge (in other words "store") an average value of the DC voltages of the plurality of photovoltaic modules (1-N).

For example, the first capacitor 300 may store an average value of the first DC voltage, which is transferred (in other words "outputted") from the first photovoltaic module 1 through the first input portion 110, and the second DC voltage, which is transferred from the second photovoltaic module through the second input portion.

The first resistor 400 may be connected in parallel to the reactor 200 and the first capacitor 300.

Also, the first resistor 400 may consume the voltages charged in the first capacitor 300.

That is, since a small quantity of currents flows through the first resistor 400, the first resistor 400 may serve to facilitate the average value of the plurality of DC voltages to be charged in the first capacitor 300.

The booster unit 500 may be connected in parallel to the first capacitor 300 and the first resistor 400 which are connected in parallel to each other.

The booster unit 500, as illustrated in FIG. 2, may include a switch 510, a diode 520, and a second capacitor 530.

The booster unit 500 may also raise (in other words "boost" or "increase") the voltage charged in the first capacitor 300.

The inverter unit 600 may convert the voltage (in other words "electric energy" or "a regulated DC electric power") boosted by the booster unit 500 into an AC voltage (in other words "AC energy" or "AC electric power" or "3-phases AC electric power"), to provide (in other words "output") to an electric power grid, such as an induction motor (not illustrated).

That is, the inverter unit 600 may receive the DC voltage (in other words "DC electric energy") from each of the plurality of photovoltaic modules through the input unit 100, convert the corresponding DC voltage into an AC voltage (in other words AC electric energy), and provide the converted AC voltage to the electric power grid.

The exemplary embodiment disclosed herein, as aforementioned, illustrates that the plurality of photovoltaic modules are connected through the single booster, without employing the booster for each input port of the multi-string photovoltaic inverter. This may result in a reduction of fabricating costs and a volume of the photovoltaic inverter.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A photovoltaic inverter comprising:
a plurality of reactors connected to a plurality of photovoltaic modules, respectively;
a first capacitor connected to the plurality of reactors, and configured to store DC voltages of the plurality of photovoltaic modules;
a first resistor connected in parallel to the first capacitor;
a booster unit connected to the first capacitor and the first resistor, and configured to boost the voltages stored in the first capacitor; and
an inverter unit configured to convert the voltage boosted by the booster unit into an AC voltage to provide to a grid,
wherein the booster unit comprises:
a switch connected in parallel to the first capacitor and the first resistor;
a diode having an anode connected to an input terminal of the switch; and
a second capacitor having a first terminal connected to a cathode of the diode, and a second terminal connected to an output terminal of the switch.

2. The photovoltaic inverter of claim 1, further comprising:
a plurality of input portions connected between the plurality of photovoltaic modules and the plurality of reactors, and connected in series to the plurality of photovoltaic modules, respectively.

3. The photovoltaic inverter of claim 1,
wherein the inverter unit comprises input ports, a number of the input ports depending on a number of the plurality of photovoltaic modules, and
wherein the booster unit is connected to the input ports of the inverter unit.

4. The photovoltaic inverter of claim 3, wherein the second capacitor is connected to the input ports of the inverter unit.

* * * * *